US007250016B1

(12) United States Patent
Petit

(10) Patent No.: US 7,250,016 B1

(45) Date of Patent: Jul. 31, 2007

(54) V-BELT DRIVE COUPLING

(76) Inventor: Douglas H. Petit, 3365 McKail, Bruce Township, MI (US) 48065

( * ) Notice: Subject to any disclaimer, the term of this patent is extended or adjusted under 35 U.S.C. 154(b) by 592 days.

(21) Appl. No.: 10/749,976

(22) Filed: Jan. 2, 2004

(51) Int. Cl.
*F16H 17/00* (2006.01)
*B23P 19/02* (2006.01)
*B23P 19/04* (2006.01)

(52) U.S. Cl. .......................... 474/130; 29/261; 29/263

(58) Field of Classification Search ........ 474/129–131, 474/902–903; 29/244, 255, 259–262, 898.08, 29/270

See application file for complete search history.

(56) References Cited

U.S. PATENT DOCUMENTS 1,515,445 A * 11/1924 Smith .......................... 29/261
1,870,711 A * 8/1932 Cooney ....................... 29/261
4,084,305 A * 4/1978 Chang ......................... 29/261
4,826,467 A * 5/1989 Reese et al. .................. 474/14
4,922,749 A * 5/1990 Steffes et al. ................. 73/116
5,048,657 A * 9/1991 Dissett et al. ......... 192/105 CD
5,167,057 A * 12/1992 Somerville ................... 29/252
6,266,860 B1 * 7/2001 Kiebler ........................ 29/259
6,665,918 B1 * 12/2003 Williams ..................... 29/259
7,007,359 B2 * 3/2006 Wilson ........................ 29/244
2001/0032385 A1 * 10/2001 Abdelmoula et al. ...... 29/426.5

* cited by examiner

*Primary Examiner*—Marcus Charles
(74) *Attorney, Agent, or Firm*—Alex Rhodes

(57) ABSTRACT

An apparatus for manually uncoupling a V-belt drive from an active power source. The apparatus is mounted on the end of a pulley of the V-belt drive and is comprised of a tapered member connected to the output shaft of the power source for engaging in holding relationship the pulley of said V-belt drive; a retractor member attached to the pulley; and a toggle linkage for displacing the retractor member relative to the tapered member to disengage the pulley from the tapered member. The toggle linkage includes a first pair of diverging toggle links and a second pair of crossing toggle links having end portions pivotally connected to end portions of said first pair of toggle links. The second pair of toggle links is mounted in a sleeve for rotation about an axis having a fixed relationship to the tapered member.

11 Claims, 4 Drawing Sheets

V-BELT DRIVE COUPLING

FIELD OF THE INVENTION

This invention relates to V-belt drives and more particularly to a V-belt drive coupling for disconnecting a V-belt drive from an electric motor.

BACKGROUND OF THE INVENTION

V-belt drives are commonly used for transmitting the torque of an electric motor to a load. They provide numerous advantages over gear drives, including, low cost, reliability, overload protection, and lubricant free operation. Numerous safety couplings exist for automatically uncoupling drives from power sources during excessive loads, however, there is a lack of devices for manually coupling and uncoupling V-belt drives from active power sources. At various times needs arise for manually connecting and disconnecting V-belt drives from an active power sources such as an electric motor.

SUMMARY OF THE INVENTION

The present invention is a relatively low cost apparatus for manually coupling and uncoupling an active electric motor from a V-belt drive. One benefit is that it can be used for manually coupling and uncoupling other power sources, by way of example, internal combustion engines from loads. The invention is broadly comprised of a holding tapered member and a co-linear toggle linkage for uncoupling the tapered member from an active power source.

In employing the teaching of the present invention, a plurality of alternate constructions can be adopted to achieve the desired objects and capabilities. In this disclosure, one preferred embodiment is described. However, the disclosed embodiment is intended as an example only and should not be considered as limiting the scope of the invention.

Further features, benefits and objects of the invention will be apparent by reference to the drawings and ensuing detailed description of a preferred embodiment which discloses the best mode contemplated in carrying out the invention. The exclusive rights which are claimed are set forth in the numbered claims following the detailed description of the preferred embodiment.

BRIEF DESCRIPTION OF THE DRAWINGS

The invention will be better understood and further objects, characterizing features, details and advantages thereof will appear more clearly with reference to the following diagrammatic drawings illustrating a preferred embodiment by way of non-limiting example only.

DETAILED DESCRIPTION OF A PREFERRED EMBODIMENT

Figures 1, 2:
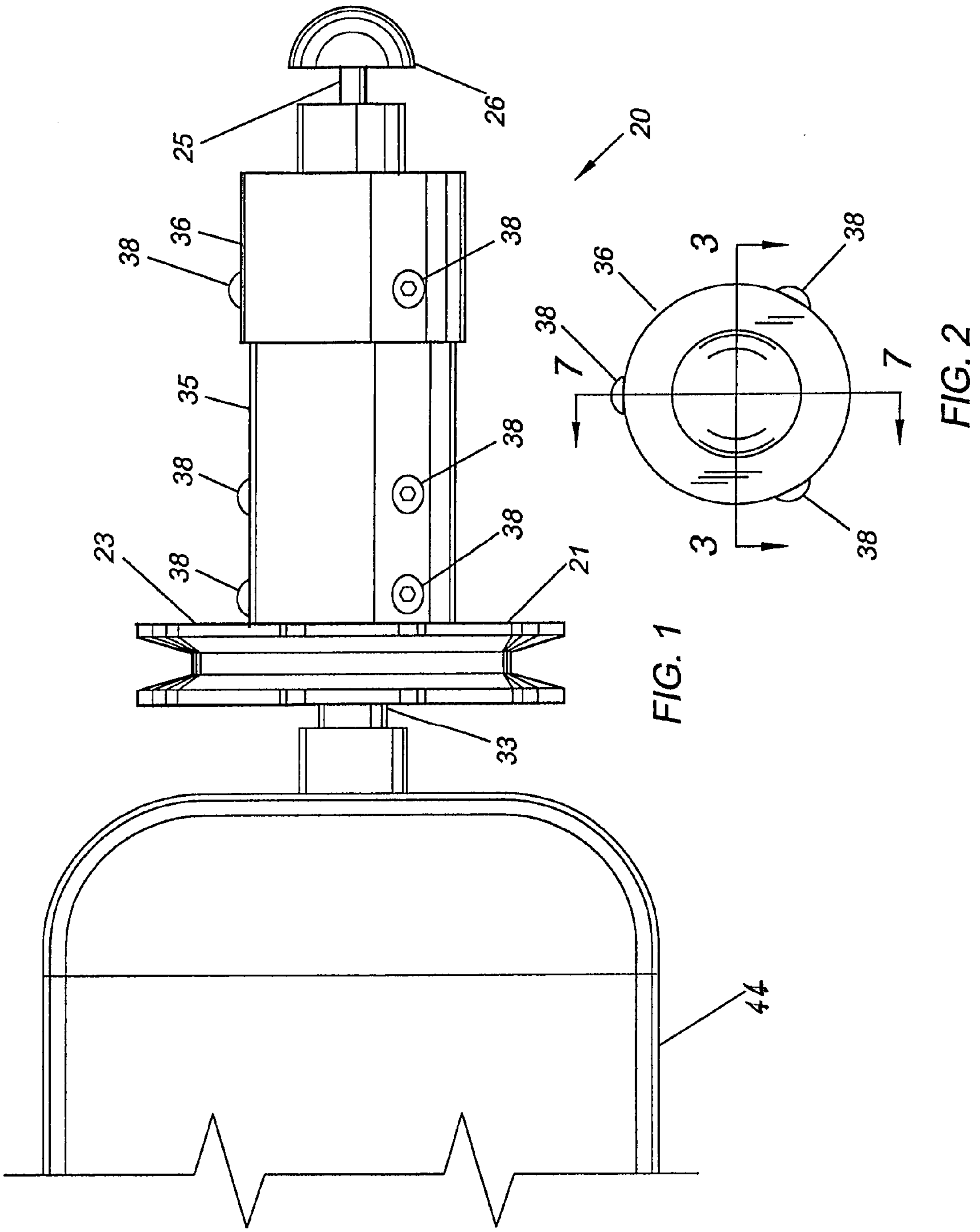
FIG. 1 is a side view of an electric motor, V-belt drive and a coupling according to the present invention.
FIG. 2 is an end view of the coupling.

Referring now to the drawings wherein like numerals designate like and corresponding parts throughout the several views, a V-belt coupling 20 is shown in FIG. 1 in combination with a V-belt drive 21 and an electric motor 44. The electric motor 44 is conventional. A pulley 23 is mounted on an output shaft 22 of the motor 44 and motor torque is transmitted to the V-belt pulley 23 with a Woodruff Key 24 or some other suitable means. The generally cylindrical shaped coupling 20 has a co-linear relationship with the motor 44 and extends outwardly from the V-belt pulley 23.

At a distal end of the V-belt drive 21 is a push rod 25 with a spherical knob portion 26 whose function will be later described in proper sequence. The construction of the V-belt drive coupling 20 is best understood with reference to FIGS. 2 and 3 together with the following description. The coupling 20 is generally comprised of a tapered coupling member 27 and an uncoupling assembly 28 for retracting the tapered coupling member 27 from a tapered aperture 29 of the V-belt pulley 23.

As shown in FIG. 2, the uncoupling assembly 28 is comprised of the push rod 25, a sleeve 32, a toggle linkage 31 mounted in the sleeve 32, a spring seat 33, a helical spring 34, a pivot block 45, a retractor member 35 and an end cap 36. One end portion of the sleeve 32 is threadably attached to an end portion of the tapered coupling member 27 and an opposite end portion of the sleeve 32 is journaled in the end cap 36. The push rod 25 is slidably mounted in the sleeve 32 and extends outwardly from the uncoupling apparatus 20. The retractor member 35 is attached to the spring seat 33 and the end cap 36 is attached to the retractor member 35 with threaded fasteners 38.

Figure 3:
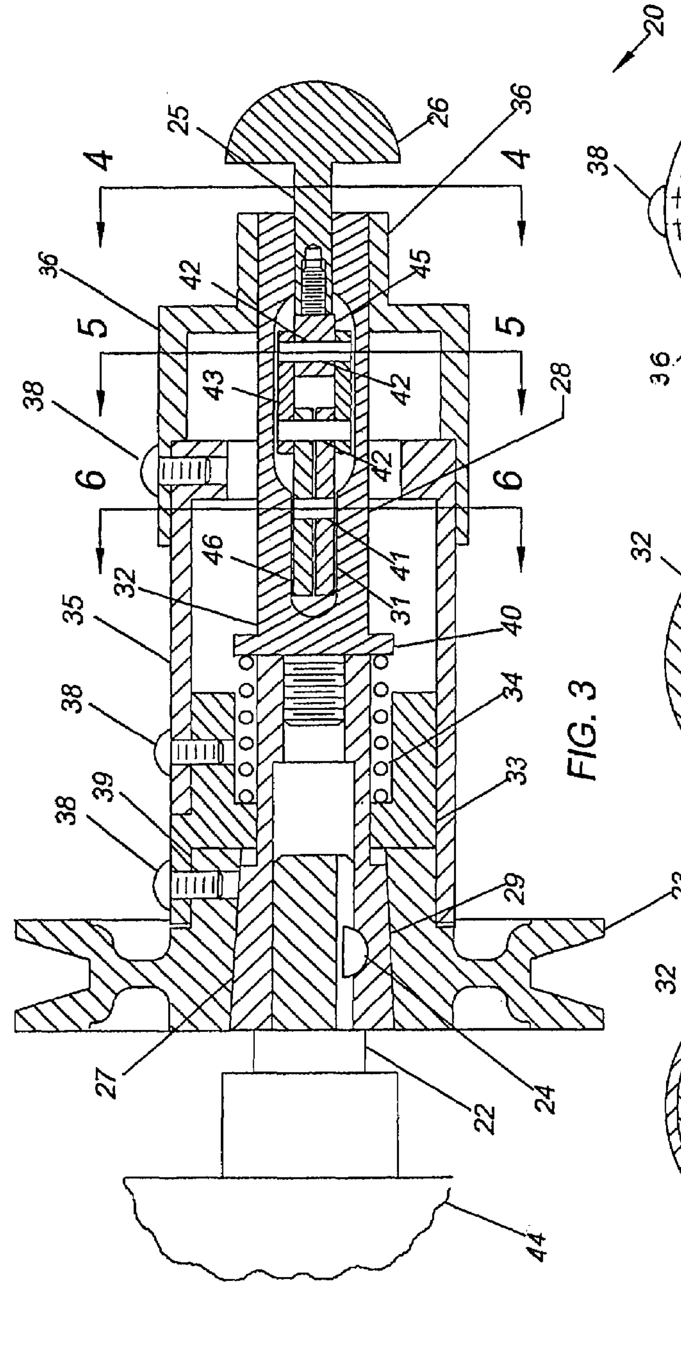
FIG. 3 is a cross-sectional view taken on the line 3-3 in FIG. 2 showing the V-belt drive coupled to an electric motor.
Figure 4:
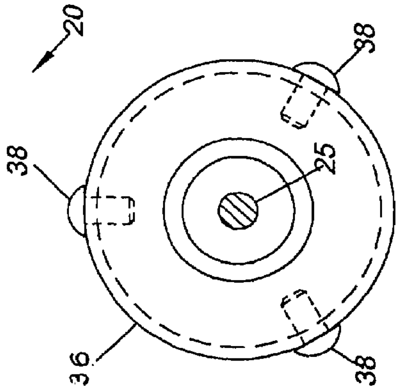
FIG. 4 is a cross-sectional view taken on the line 4-4 in FIG. 3.
Figure 5:
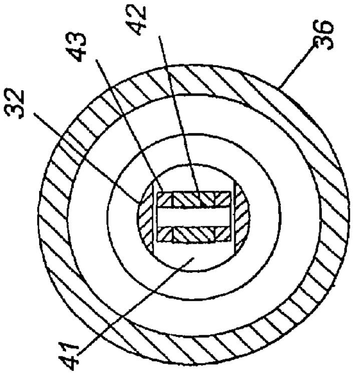
FIG. 5 is a cross-sectional view taken on the line 5-5 in FIG. 3.
Figure 6:
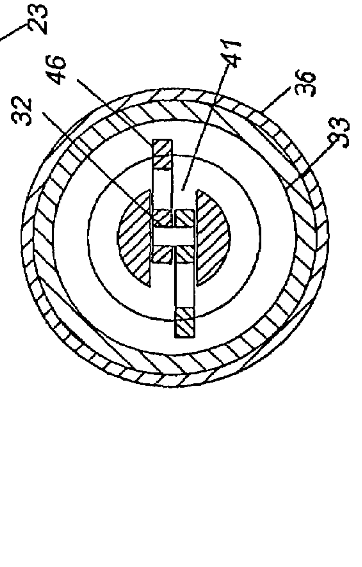
FIG. 6 is a cross-sectional view taken on the line 6-6 in FIG. 3.

As shown in FIGS. 3 and 4, the spring seat 33 is attached to a shoulder of the pulley 23 with treaded fasteners 38. The helical spring 34 extending along an axis of the uncoupling assembly 28 from a recess in the spring seat 44 to a flange of the sleeve 32 urges the tapered coupling member 27 in contact with the tapered aperture 29 of the pulley 23. The taper of the coupling member 27 is about 3 degrees which is about the same as the Morse holding taper commonly used in a variety of mechanical devices. Other suitable holding tapers exist, such as the Brown and Sharp and Jarno tapers which slightly differ from the well known Morse taper. The V-belt pulley 23 and tapered coupling member 27 can be made of aluminum to increase the holding power by providing a high coefficient of friction.

Figure 7:
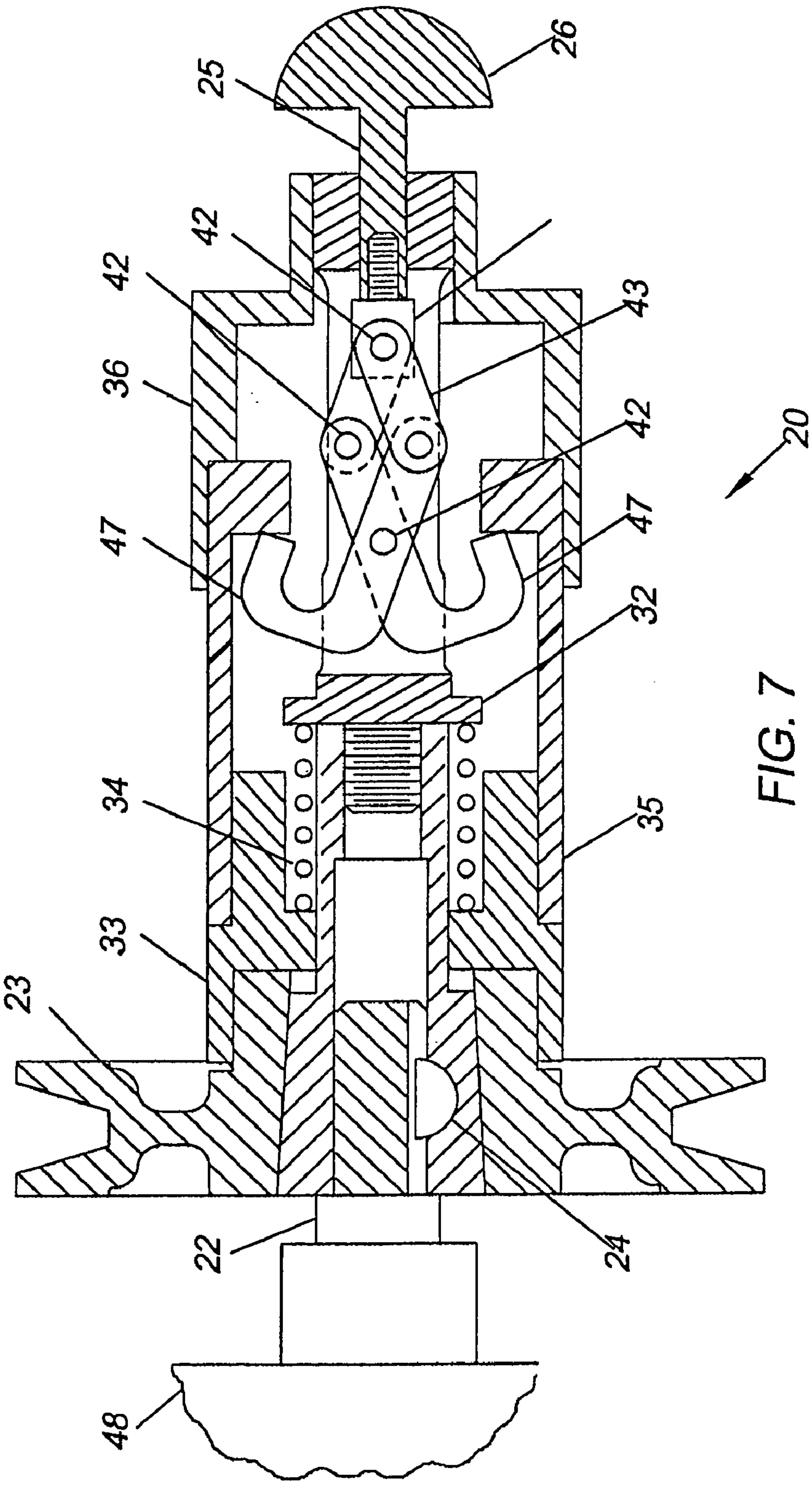
FIG. 7 is a cross-sectional view taken on the line 7-7 in FIG. 2.

Referring now to FIGS. 3 and 7, a slot 41 in the sleeve 32 receives the toggle linkage 31. The toggle linkage 31 is comprised of the pivot block 45, a first pair 43 of outwardly extending toggle links pivotally attached to the pivot block 45 with a pin 42 and a second pair 46 of crossing toggle links pivotally attached at end portions to the first pair 43 with pins 42. The second linkage pair 46 is attached to the sleeve 32 at their point of crossing with a third pin 42. The second linkage pair 46 has arcuate end portions 47 which press against and move the retractor member 35 when the push rod 25 is depressed. The pin 42 which joins the linkage pair 46 at the crossing point has a fixed relationship to the sleeve 32 and is not displaced relative to the sleeve 32 when the push rod 25 is depressed. The pivot block 45 is threadably attached to an inner end portion of the push rod 25.

Figure 8:
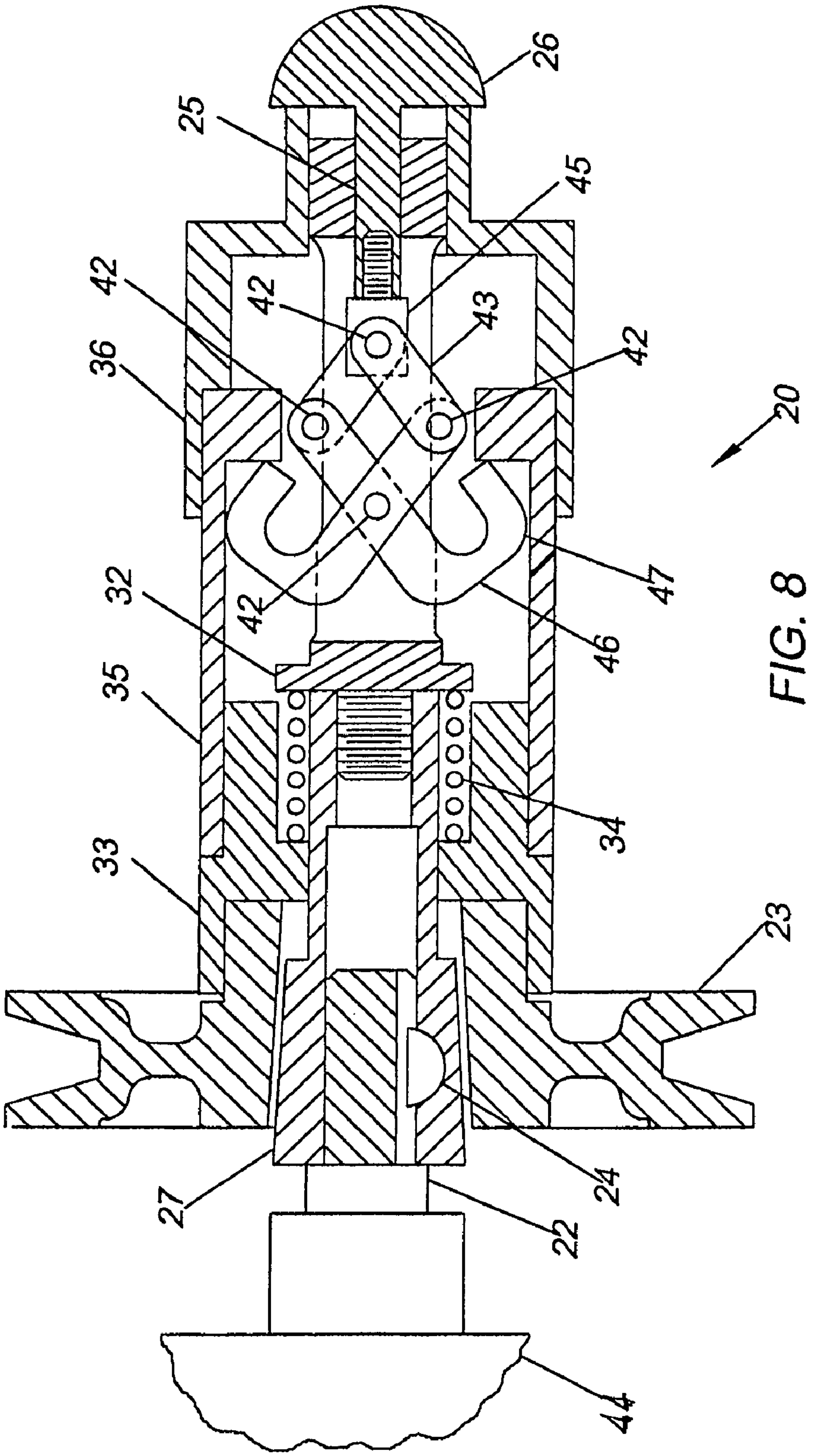
FIG. 8 is a cross-sectional view taken in the same manner as FIG. 3 showing the V-belt drive un-coupled from the electric motor.

The V-belt coupling 20 operates in the following way. When the push rod 25 is depressed, the first linkage pair 43 advances toward the tapered coupling member 27, causing the coil spring 34 to compress and the arcuate end portions 47 of the second linkage pair to move the retracting member 35 relative to the tapered coupling member 27, thereby separating the pulley 23 from the tapered coupling member as shown in FIG. 8.

When the push rod 25 is released, the coil spring 34 expands allowing the tapered coupling member 27 to re-engage the V-belt pulley 23 as shown in FIGS. 2 and 3.

From the foregoing, it will be understood that my invention provides an effective, relatively low cost means for coupling and de-coupling a V-belt drive from a power source. Although only a single embodiment has been illustrated and described it will be appreciated that other embodiments can be derived by such changes as inversion of element, re-arrangement of elements, substitution of elements and elimination of elements which are obvious to persons skilled in the relevant art without departing from the spirit thereof.

What I claim is new is:

1. An apparatus for manually uncoupling a V-belt drive from an active power source, comprising: a tapered member connected to said active power source for engaging in holding relationship a pulley of said V-belt drive; a means for disengaging said tapered member from said V-belt drive when said power source is active, said disengaging means comprising, a retractor member attached to said pulley of said V-belt drive, a toggle linkage for causing said retractor member to disengage said tapered member from said V-belt drive, said toggle linkage including a first pair of diverging toggle links and a second pair of crossing toggle links having end portions pivotally connected to end portions of said first pair of toggle links, a sleeve for pivotally mounting said second pair of toggle links for rotation about an axis passing through an intersection of said second pair of toggle links, said axis having a fixed relationship to said tapered member; and a push rod for operating said toggle linkage to cause said retractor member to disengage said tapered member from said V-belt drive.

2. The apparatus recited in claim 1 further comprising a spring for engaging said tapered member with said V-belt drive.

3. The apparatus recited in claim 1 wherein said tapered member has a holding taper of about 3 degrees.

4. The apparatus recited in claim 1 wherein said tapered member is made of aluminum.

5. The apparatus recited in claim 1 wherein said toggle linkage has a co-linear relationship with said tapered member.

6. The apparatus recited in claim 1 wherein said power source is an electric motor.

7. The apparatus recited in claim 1 wherein said sleeve has a slot for receiving said toggle linkage.

8. The apparatus recited in claim 1 wherein said push rod is slidably mounted for movement in said sleeve.

9. The apparatus recited in claim 1 wherein said push rod extends outwardly from said coupling apparatus to a spherical distal end knob portion.

10. An apparatus for manually uncoupling a V-belt drive from an active power source, comprising: a tapered member connected to said active power source for engaging in holding relationship a pulley of said V-belt drive; a means for disengaging said tapered member from said pulley of said V-belt drive when said power source is active, said disengaging means comprising, a retractor member attached to said pulley; a sleeve slidably mounted in said apparatus for receiving a toggle-linkage having end portions for displacing said retractor member to disengage said pulley from said tapered member; said toggle linkage including a first pair of diverging toggle links and a second pair of crossing toggle links pivotally connected to end portions of said first pair of toggle links, for rotation about an axis passing through said sleeve and an intersection of said second pair of toggle links, said axis having a fixed relationship to said tapered member; said second pair of toggle links having end portions for disengaging said pulley with said tapered member by displacing said retractor member relative to said tapered member.

11. An apparatus for manually uncoupling a V-belt drive from an active power source, comprising: a tapered member connected to said active power source for engaging in holding relationship a pulley of said V-belt drive; a means for disengaging said tapered member from said pulley of said V-belt drive when said power source is active, said disengaging means comprising, a retractor member attached to said pulley, a sleeve slidably mounted in said apparatus having a slot for receiving a toggle linkage; a toggle linkage pivotally mounted in said sleeve, said toggle linkage including a first pair of diverging toggle links and a second pair of crossing toggle links pivotally attached to said first pair of toggle links, said second pair of links having distal end portions for displacing said retractor member relative to said tapered member to disengage said pulley from said tapered member; and a push rod for actuating said toggle linkage to disengage said tapered member of said active power source from said pulley.

* * * * *